Feb. 6, 1968 J. C. LA PLANTE 3,367,756
GOLD TIN ALLOY CLAD PRODUCT
Filed March 25, 1966
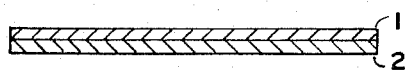
INVENTOR.
JERRY C. LA PLANTE
BY
James P. Malone

United States Patent Office 3,367,756
Patented Feb. 6, 1968

3,367,756
GOLD TIN ALLOY CLAD PRODUCT
Jerry C. La Plante, Hempstead, N.Y., assignor to Alloys Unlimited Inc., Melville, N.Y.
Continuation-in-part of application Ser. No. 428,750, Jan. 28, 1965. This application Mar. 25, 1966, Ser. No. 537,466
1 Claim. (Cl. 29—199)

This application is a continuation in part of my copending application entitled Gold Alloy Clad Products, Serial No. 428,750, filed January 28, 1965, now Patent 3,245,764.

This invention relates to means and methods of cladding gold tin alloys on substrates such as nickel, nickel iron, Kovar, molybdenum and related materials.

More specifically, we are referring to gold tin alloys of 15% to 25% tin, the balance being gold.

It is difficult to achieve good cladding due to the fact that the gold alloys do not normally form a good bond with the substrate material or even with a gold clad substrate material.

After many unsuccessful experiments, good results were achieved by first leaching the gold alloy to form a porous surface layer of gold. This porous layer then will form a good bond with a gold clad substrate, for instance by hot rolling.

Accordingly, a principal object of the invention is to provide new and improved products of clad gold tin alloys on a substrate metal.

Another object of the invention is to provide a new and improved product comprising a leached gold tin alloy clad on a metal substrate.

Another object of the invention is to provide new and improved products of clad gold tin alloys made by the process of leaching the gold alloys to form a porous gold layer and then bonding said porous layer onto a gold clad substrate material.

Another object of the invention is to provide new and improved products of clad gold tin alloys on metals such as nickel, nickel iron, Kovar, molybdenum, and related materials.

Another object of the invention is to provide new and improved products of leached clad gold tin foils.

These and other objects of the invention will become apparent from the following specification and drawing which is a cross sectional view of a gold tin silicon alloy clad on a metal substrate.

The following unsuccessful experiments were made:

*Example 1.*—Alloy the gold tin eutectic directly onto the substrate by "puddling" or melting, using a variety of fluxing and reducing conditions. Due to the large thermal expansion difference between the gold eutectics and the substrate materials, no adequate bond was created with a resulting cracking and peeling at the interface.

*Example 2.*—A thin alloy gold cladding was put on the substrate and then the gold tin alloy was alloyed directly onto the clad surface. This, too, proved unsuccessful for the same reasons.

*Example 3.*—Pressure bonding directly on the substrate was attempted. Results again were unsuccessful.

*Example 4.*—Pressure bonding plus heat were employed, directly on the substrate. This, too, proved unsuccessful.

*Example 5.*—Pressure bonding plus heat on the thin gold clad substrate was attempted. Results were again similar.

It became obvious that a bond must be made at a temperature low enough to prevent peeling due to expansion difference. This would entail solid state bonding. Conventional techniques of pressure bonding to the base metal were unsuccessful. Further work with pressure bonding (plus heat) onto pure gold preclad material was only partially successful.

It became apparent that bonding was being prevented by the existence of tin rich eutectic phase—present on the eutectic alloy surface.

This was eliminated by leaching of the alloy material to leach out the tin rich phase from the surface by immersion in a proper leaching solution for an appropriate length of time. For example, if the tin alloy is leached for six hours in concentrated HF the surface is depleted of the tin phase to a depth of approximately .0001 inch. This produces a pure gold surface which is readily bonded by standard heat and/or pressure techniques to a gold preclad base material.

The general successful process is as follows:

The gold tin alloy is leached for six hours in concentrated hydrofluoric acid to deplete the surface of the tin in the alloy to a depth of approximately 1/10 of a mil, thereby providing a gold rich, probably porous layer.

The alloys referred to are gold tin 15% to 25% tin.

The alloy sheet is then bonded to a gold clad substrate by hot rolling, at a temperature below the melting point of the alloy.

In one specific embodiment it was desired to clad gold tin on Kovar having a gold layer on the other side of the Kovar. The gold layer on the other side of the Kovar is not necesary to the present process. The following steps were taken:

(1) Take a sheet of gold foil .070" thick having convenient dimensions for instance 3" x 6".

(2) An ingot of substrate Kovar approximately 1/4" thick having equal dimensions.

(3) A sheet of gold foil .005"–.001" thick having equal dimensions.

(4) Sandwich the Kovar between the gold sheets and weld around the edges with a heliarc torch.

(5) Heat the assembly to approximately 1300° F. in a reducing atmosphere, for instance of hydrogen.

(6) Roll out the assembly in a rolling mill to approximately .075" thick. The thickness is reduced approximately 25% per pass in the rolling mill.

(7) Anneal at a temperature of 1300°–1400° F. for approximately 1 hour.

(8) Cool in a reducing atmosphere.

(9) To apply the gold tin take a sheet of gold tin foil approximately .015" thick of the same size as the rolled out assembly.

The optimum composition is 80% Au/20% Sn. The 80% Au composition is when eutectic occurs in the Au/Sn system. This composition has a melting point of 280° C. and as such is a low melting Au solder. The solder has the general characteristics of being very resistant to low acid etches and is, therefore, far superior to high Sn compositions for semiconductor applications. It also has the properties of being considerably stronger than the high Sn compositions as well as harder than the high Au compositions.

(10) Leach the gold tin foil in hydrofluoric acid or equivalent for approximately six hours. This may be at room temperature as the temperature is not critical. The leaching process removes the tin along the surface leaving a porous surface layer of gold.

(11) The leached gold tin foil is then placed on the thin gold clad side of the Kovar of the three-layer assembly. This four-layer assembly is then rolled at approximately 500° down to approximately .009". The porous surface of gold on the alloy forms a good bond with the gold clad Kovar.

In the above example it was desired to sandwich the Kovar between the alloy and a second layer of gold. If the second gold layer is not desired, it may be merely eliminated from the process. It does not affect the bonding of the alloy.

The figure shows a cross sectional view of a gold tin sheet of foil 1 having a leached surface clad onto a metal substrate 2 for instance, of the group including nickel, nickel iron, Kovar, molybdenum or other equivalent materials, according to the process described.

Many modifications may be made by those who desire to practice the invention without departing from the scope thereof which is defined by the following claim.

I claim:

1. The product consisting of a metal substrate, a gold layer mechanically clad on said substrate, and a gold tin alloy mechanically clad on said gold layer and thus bonded to the metal substrate, said gold tin alloy consisting of 15% to 25% tin.

References Cited

UNITED STATES PATENTS

| 440,693 | 11/1890 | Burdon | 29—199 |
| 1,008,970 | 11/1911 | Kessler | 29—199 |
| 1,090,939 | 3/1914 | Newton | 29—199 |
| 3,031,747 | 5/1962 | Green | 39—199 |
| 3,245,764 | 4/1966 | La Plante | 29—196 |

FOREIGN PATENTS

| 24,044 | 1911 | Great Britain. |

OTHER REFERENCES

"Constitution of Binny Alloys" by Dr. Hansen, published 1958 by McGraw-Hill Book Co., pp. 232–234.

HYLAND BIZOT, *Primary Examiner.*